United States Patent
Tuli

(10) Patent No.: US 6,894,661 B1
(45) Date of Patent: May 17, 2005

(54) HAND-HELD DEVICE WITH FOLDABLE DISPLAY SCREEN AND KEYBOARD

(76) Inventor: Raja Tuli, 1155 Rene Levesque West, Montreal, BC (CA), H3B 3T6

( * ) Notice: Subject to any disclaimer, the term of this patent is extended or adjusted under 35 U.S.C. 154(b) by 421 days.

(21) Appl. No.: 09/637,628

(22) Filed: Aug. 14, 2000

(51) Int. Cl.$^7$ .................................................. G09G 5/00
(52) U.S. Cl. ........................................ 345/1.1; 345/169
(58) Field of Search ........................... 345/1.1, 1.3, 2.2, 345/3.1, 173, 168, 169; 379/428.01, 428.03, 433.03, 433.04, 433.08; 455/566, 572, 575.1; 361/680, 681

(56) References Cited

U.S. PATENT DOCUMENTS

| | | | | |
|---|---|---|---|---|
| 5,287,554 A | * | 2/1994 | Furuno | ........................ 455/572 |
| 5,422,656 A | * | 6/1995 | Allard et al. | ................ 345/173 |
| 6,088,220 A | * | 7/2000 | Katz | ........................... 361/680 |
| 6,256,017 B1 | * | 7/2001 | Bullister | ...................... 345/168 |
| 6,297,945 B1 | * | 10/2001 | Yamamoto | ................... 361/681 |

* cited by examiner

*Primary Examiner*—Chanh Nguyen
(74) *Attorney, Agent, or Firm*—Blakely, Sokoloff, Taylor & Zafman LLP

(57) ABSTRACT

The present invention discloses a portable device for accessing the Internet that is compact and lightweight and comprises a display screen of 640 pixels×240 pixels. The display screen is divided into two portions that are connected with a hinge, thus the display screens are foldable. In another embodiment, a keyboard is divided into two portions and the portions are attached to the display screens with hinges. The keyboards fold into the display screens. In another embodiment, a virtual browser that sends information to the device is formatted such that text is displayed on one side of the display screen therefore the user does not have to skip over the hinge while reading.

4 Claims, 9 Drawing Sheets

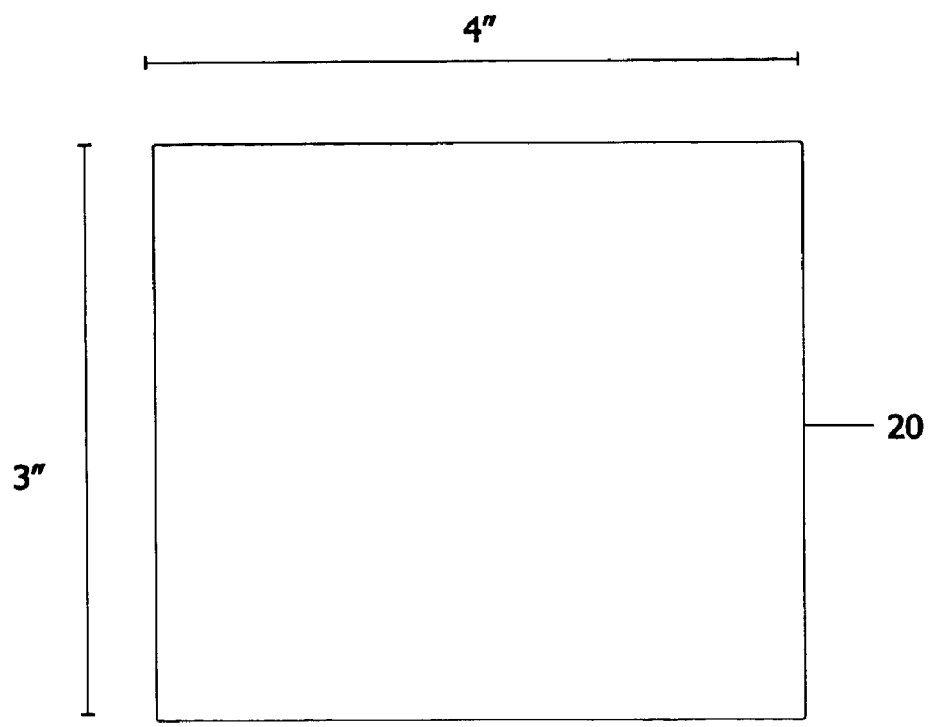
Figure 5 - PRIOR ART
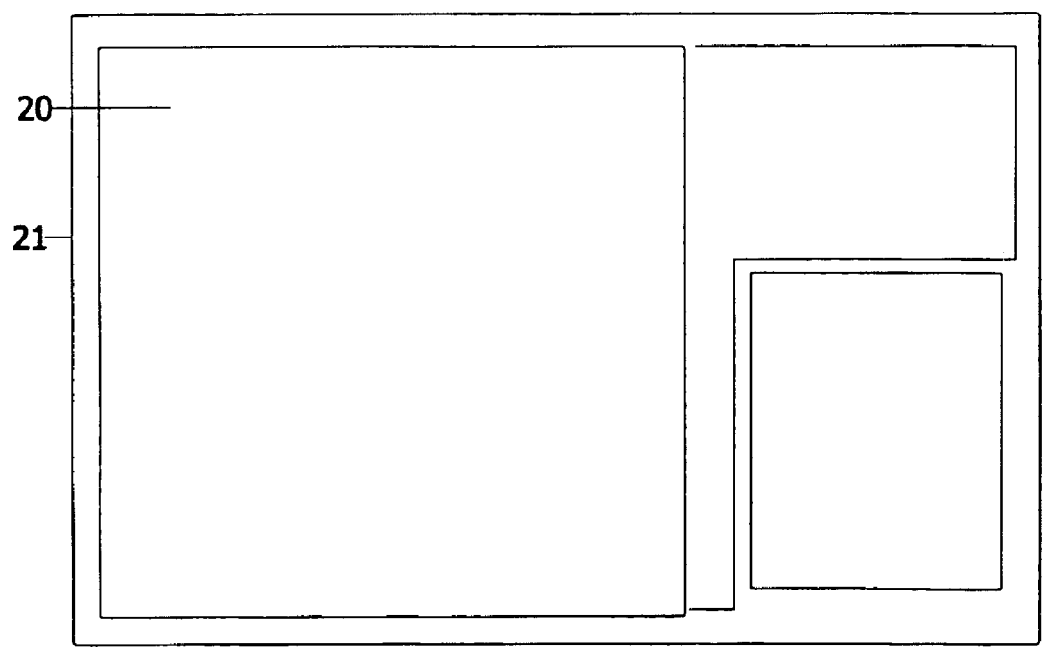
Figure 6 - PRIOR ART

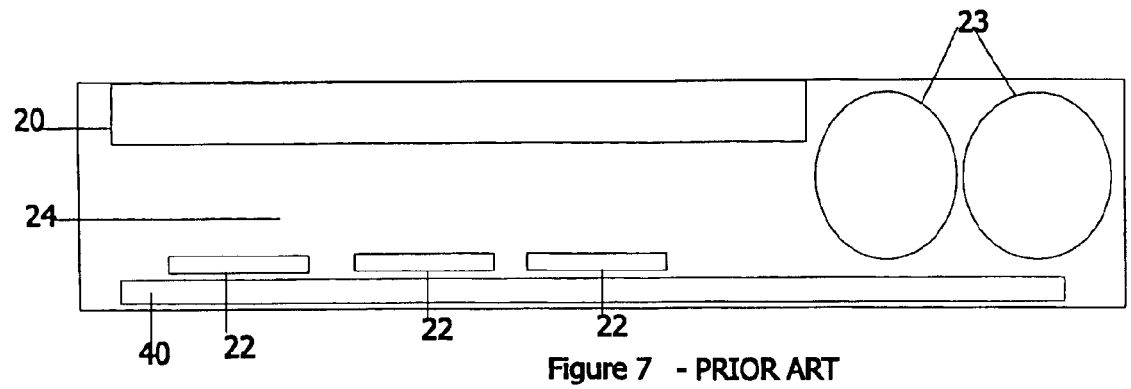
Figure 7 - PRIOR ART
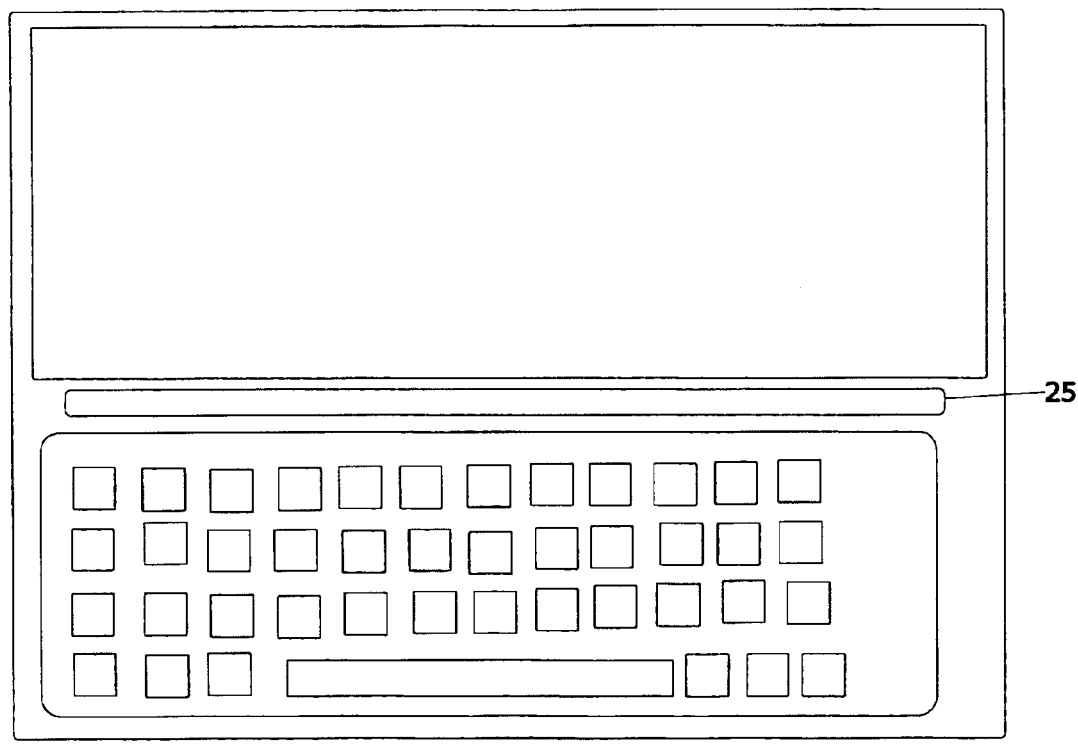
Figure 8 - PRIOR ART

HAND-HELD DEVICE WITH FOLDABLE DISPLAY SCREEN AND KEYBOARD

PRIOR ART

The background of the present invention includes all portable and hand-held devices, and personal digital assistants (PDAs) manufactured by Compaq, Hewlett-Packard or any other computer company. These compact and lightweight devices are useful and include many features, such as an organizer and e-mail access, which render them quite indispensable to the user. However, these devices have small display screens that are often difficult to see. The present invention aims to provide a hand-held device that comprises a display screen that is approximately twice the width of a display screen of a standard hand-held device.

SUMMARY

The object of the present invention is to disclose a portable and hand-held device that comprises a display screen of 640 pixels×240 pixels. The display screen is divided into two parts and the parts are connected with a hinge. The hinge allows the display screen to fold and in a folded position the two display screens face each other.

It is a further object of the present invention to disclose a keyboard that is divided into two portions. The two portions of the keyboard attach to the display screens with hinges, thus the keyboards can fold. In a folded position, the keyboards fit into an indentation between the display screens and the housing of the device.

It is a further object of the present invention to disclose a host computer comprising a virtual browser. The virtual browser is formatted for 320 pixels×240 pixels, thus text that is sent to the device is formatted for 320×240 and will fit in one side of the display screens.

DETAILED DESCRIPTION OF THE DRAWINGS

The invention is described in more detail below with respect to an illustrative embodiment shown in the accompanying drawings in which:

FIG. 5 (prior art) depicts a display screen

FIG. 6 (prior art) shows the display screen integrated into a portable device

FIG. 7 (prior art) shows the internal components of the portable device

FIG. 8 (prior art) depicts another portable device

PREFERRED EMBODIMENT OF THE PRESENT INVENTION

The principal embodiment of the present invention aims to provide a device that allows a user to access the Internet or the World Wide Web (WWW), which device is similar to a palm top computer. Currently, existing palm top devices such as the Palm Pilot VII and Windows CE type devices contain an operating system, and within the operating system a mini-browser to interpret information received from the WWW or Internet and then display this information on the screen. This requires a powerful microprocessor. The dimensions of these devices are controlled by the sizes of the batteries, and thus there is generally ample empty space within the housings of these devices. It is an object of the present invention to disclose a device that utilizes fully the interior space of the housing such that the device can provide a maximum displayable area on the display screen.

Disclosures of applications previously filed and describing portable devices Ser. Nos. 09/496,172, 09/501,585, 09/504,809, 09/504,808 and 09/504,807 are each specifically incorporated by reference.

Figure 1:
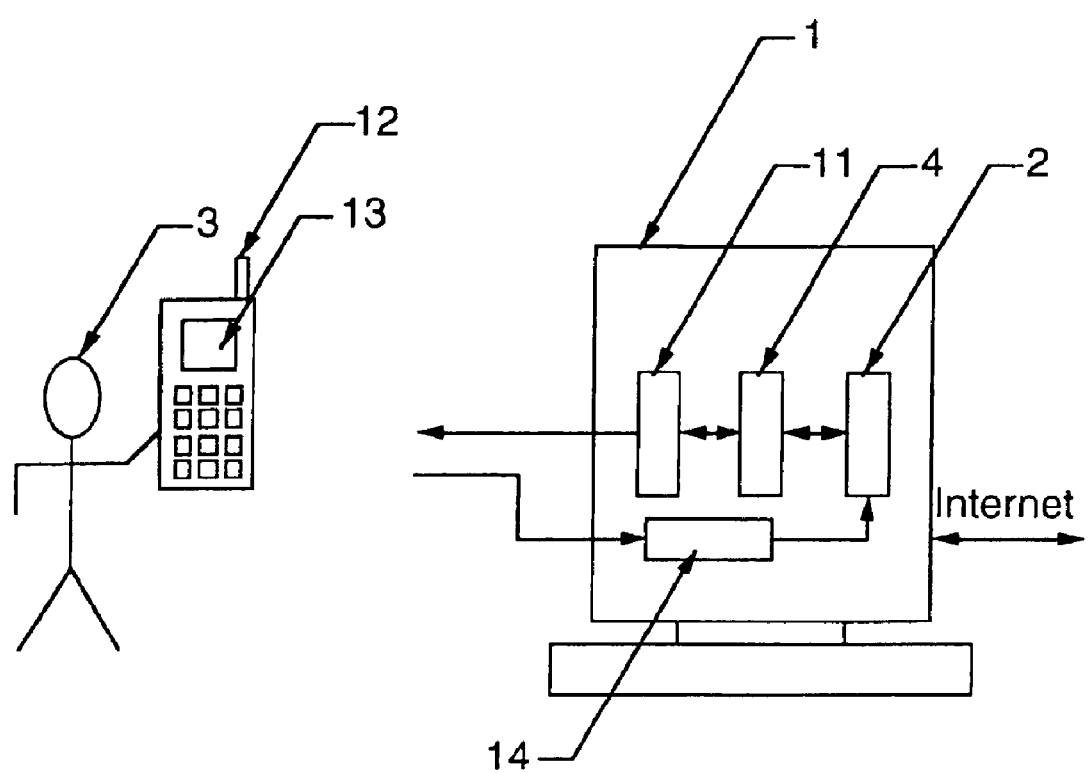
FIG. 1 illustrates a block diagram of the host computer, the portable device with wireless connection and the user.
Figure 2:
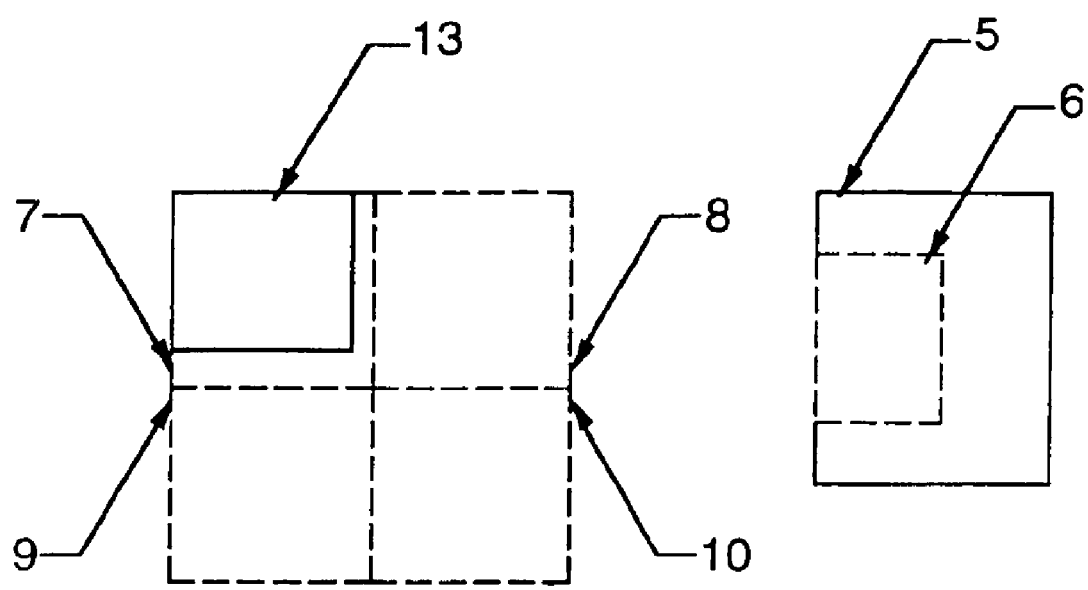
FIG. 2 illustrates portions of the image with respect to the displayable area.

Briefly the present invention may be described with reference to FIG. 1. A host computer 1 is depicted that is connected to the Internet and may also be a Web server. Running in the host computer, is a Web server program 2. When a remote user 3 requests to view a Web page (or electronic message etc.) the Web server software receives HTML, JAVA, etc. information and transmits this information to another software, the Browser Translator 4. This software translates the information, (i.e. the entire image comprising graphics and text) received in the form of HTML, Java, etc. (information may be gathered from different sources) and translates it to a black and white bit map or raster image. In another embodiment, the software translates the information into a raster or color image. The image 5, as shown in FIG. 2, contains the information that would normally be displayed on a single Web page. The translation program therefore, also acts as a virtual browser 6. As can be seen in FIG. 2, the image 5 to be displayed in a browser window 6 is usually larger than the displayable area of the browser window 6.

Figure 3:
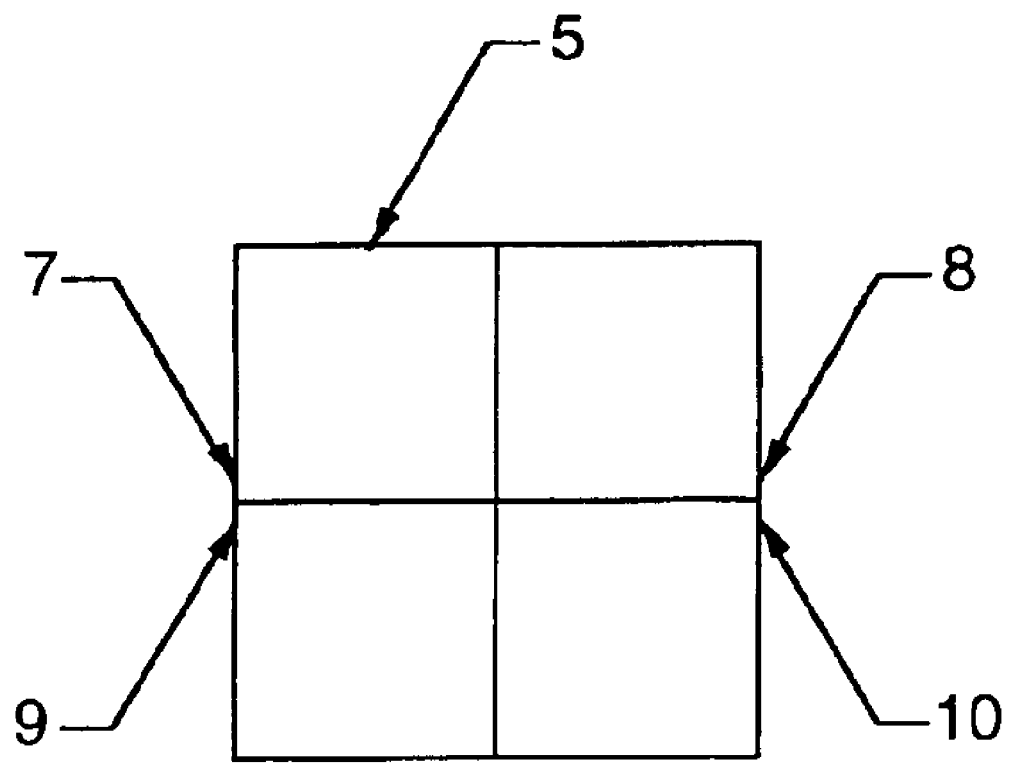
FIG. 3 illustrates sub-divisions of the image to be displayed.
Figure 4:
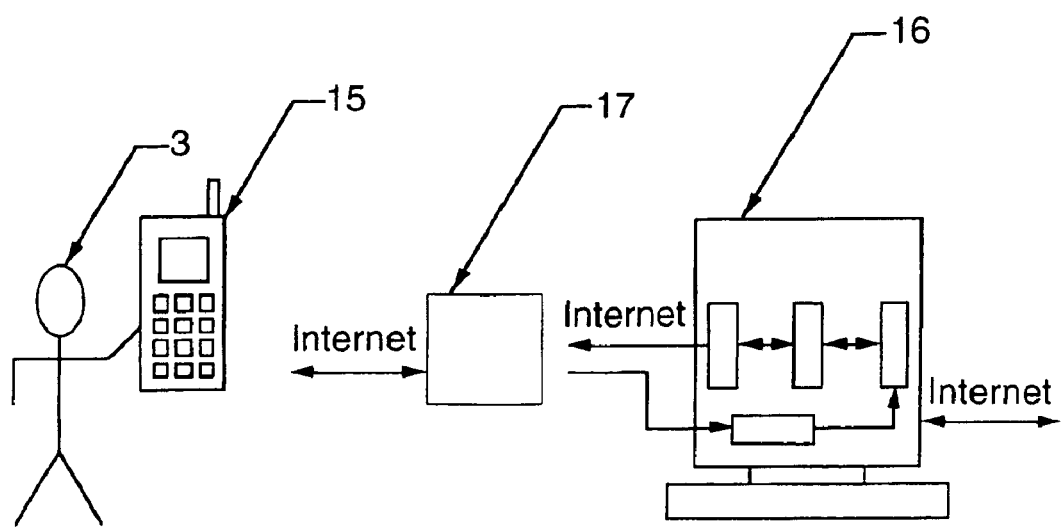
FIG. 4 illustrates the portable device, the direct server and the host server.

The image 5 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the host computer 1 (FIG. 1), which compresses the image using a loss-less compression method. The compression method may be group 3 or group 4, or another method.

The programs 4 and 11 can have multiple instances running simultaneously on the host server for the purpose of connecting to multiple users. The compressed image, after being processed by program 11, is sent to the user, using a protocol in which information may be broken down into packets.

The information is received by a palm top device 12 that has the ability to display a monochrome image, in its display window 13. The information is decompressed and displayed in the order of priority such that part of image 7, which substantially or completely covers the displayable area 13 (FIG. 2), of the palm device is decompressed and displayed first and then sequentially the portions 8, 9, 10 of the image are decompressed and stored in an internal memory of the palm top device to be displayed later when the user scrolls up, down, or sideways to these parts of the image.

A CPU resident in the palm top device therefore has the ability to decompress a bit map or raster image that may be larger than the size of the display and allow the user to traverse this bit map or raster image. The primary method of traversing the image is through conventional scroll bars positioned at the sides of the image.

The resident CPU on the palm top device has no ability to determine which parts part or parts of the image, that is being displayed, represent links to other Web pages etc. Thus, the translator program 4 (FIG. 1) translates the image in the virtual browser 6 such that the words that represent links on the page 5 (FIG. 2) are translated to be slightly bolder. The user may therefore consider text that is bold to be links.

The palm top device provides the user with a pointing device. This pointing device may be a touch screen or tracking ball, etc. The palm top device also allows the user to click on specified areas. As soon as the user clicks on part of an image, the shape of the pointer changes from an arrow to an hourglass. A message is sent to the host computer, transmitting the location of the clicked down event. A program 14 interprets the message and provides a virtual click down in the virtual browser created in the translator program 4. If the user has pressed in an area of the image that does not represent a link or text box, a message is dispatched to the palm top device which immediately changes the hourglass shape of the pointer back to an arrow (in the case of a touch screen, from an hour glass to nothing). Further to this, if the user has clicked on a part of the image which represents a link, a new Web page is extracted from the Internet or WWW, translated by translator program 4 (FIG. 1) into a bit map or raster, and compressed by compression program 11 and dispatched to the palm top device where a new page is displayed. Furthermore, the image 5 is continuously being updated and translated and sent to the palm top device where it is continuously being refreshed. This occurs once every few seconds.

When the user clicks in a text box or in a box in the display area into which letters or numbers must be input, the cursor first changes into an hourglass, and a message is sent to the host server. The host server recognizes that the click down event has occurred in the text box, and sends a message back to the palm top device to inform the palm top device to pop-up a keyboard on part of the screen. The user then types, using the pointer, the letters or words to be entered into the text box and presses "enter" or "go". The keyboard then disappears and the cursor changes back to an hourglass shape (in another embodiment, the keyboard could be replaced with a real keyboard or with an area that recognizes users' handwriting). The information typed into the text box is transmitted in a message to the host computer. The host computer enters the information into a text box in the virtual browser.

The user sees, after a short pause, as the image is refreshed on the palm top device, that the words, or letters or numbers have been entered into the text box. Further to this, the host computer may also break up the image such that the portion that has been changed, i.e. the text box area, is sent first.

In another embodiment of the present invention, images are only refreshed when is as event occurs such as a mouse down event on a link or in a text box.

In a further embodiment only those portions of the image that changes may be transmitted from the host computer to the palm top device. Other images in the virtual browser that are continuously changing, such as banner advertisements, may be the only other images sent to the palm top computer as they change.

In the principal embodiment, the palm top device also contains a modem, which can be linked to the user's mobile telephone 15 and information that is communicated between the palm top device and the host computer is sent and received wirelessly through the mobile telephone.

Furthermore, the palm top device only contains enough memory to store the current displayable page. When the user presses a back or forward button, a message is sent to the host server, and the host server sends the reference page. The back and forward buttons etc. may be hard wired into the palm top device, or may be part of the display area.

Further to this, part of the image representing buttons (and other things) on the virtual browser may be sent as part of the compressed image and buttons such as forward and back may be treated the same way as links are handled as previously described.

In another embodiment, the palm top device comprises a modem that permits the device to connect to a cellular telephone 15 in digital format.

In another embodiment, the connection to the cellular telephone 15 is made through an analog modem connected to an ear jack of the cellular telephone.

In yet another embodiment of the present invention, the modem is replaced by an analog modem that has the capability to be connected to a landline providing a standard 56 kbps-type connection.

Further embodiments may provide connections through ISDN, cable modems etc.

In a further embodiment, the palm top device may contain a large screen to be used in a fashion similar to a home Internet appliance.

In a further embodiment, the image transferred between the host computer and the remote device (previously the palm top device) may be a color image and the compression method used may be of a Jpeg or other compression methods used for color images. A gray scale image may also be used to reduce bandwidth or display costs.

In a further embodiment, the device includes no screen, but only outputs to be hooked to a television screen or external monitor for display.

The remote device in the principal embodiment only has the ability to decompress the image it receives; display the image it receives; allow the user to scroll through the image; provide the user with a pointing device to point and click on the image; send messages providing location of click down event; provide the user with a method to input letters and numbers; send a message containing these letters and numbers.

The principal embodiment contains no other structured or intelligent information about the image.

Prior art for the principal embodiment will now be described with reference to FIG. 5, which illustrates an enlarged view of a display screen 20 of a standard palm top device that is currently on the market. The width of the displayable area is 4" and the height is 3", comprising 320 pixels by 240 pixels.

FIG. 6 illustrates the display screen 20 integrated into the housing 21 of the palm top device. The device is compact and lightweight and is easily carried anywhere. FIG. 7 depicts a cross-sectional view and block diagram of the internal components of the palm device. The display screen 20, multiple components 22 and PC board 40 and batteries 23 are illustrated, and a person of ordinary skill can plainly observe the ample unused space 24, between the display screen and the components. Thus, although the device is compact and lightweight, it does not utilize efficiently the internal area. This space is produced because the height of the batteries is much greater than the height of the other components: The height of the device is dependent upon the dimensions of the batteries.

FIG. 8 depicts another type of prior art. A portable device with keyboard that can fold along hinge 25, however, this device, even when folded is too heavy and bulky to be easily carried anywhere.

The preferred embodiment of the present invention will now be described with reference to FIG. 9. The present invention discloses a portable and hand-held device that integrates a display screen comprising dimensions of 640 pixels×240 pixels (twice the width of a standard hand-held device) into its design while maintaining a compactness equivalent to other palm top devices. The size is achieved because the device exploits all of the available internal space and utilizes the dimensions of the batteries (the largest internal components) to maximize the dimensions of the display screen. The device is therefore able to provide a display screen with a maximum displayable area for a portable and hand-held device.

The device 26 comprises multiple electronic components 27 required for operating the hand-held device, such as a power supply and microprocessor. A PC board 41 is also included. Batteries 28 provide an internal power source. The display screen is divided into two portions A and B that are joined together by hinge 30 and as shown in FIG. 9 the display screen is in a folded position. In the folded position the display screens A and B face each other. Housing Y contains display A and housing X contains display B. The device further includes a pen or stylus 50 that inserts into the hinge 30 for usage on the touch screen of the display.

The height of the batteries is 10 mm and therefore the minimum thickness of the device is 10 mm. As is shown in the prior art (FIG. 7), other hand-held and palm top devices are not built efficiently because these devices contain ample unused space. The present invention however manipulates the internal area of the housing of the device such that there is sufficient area remaining that can be used to increase the displayable area of the display screen.

Figure 9:
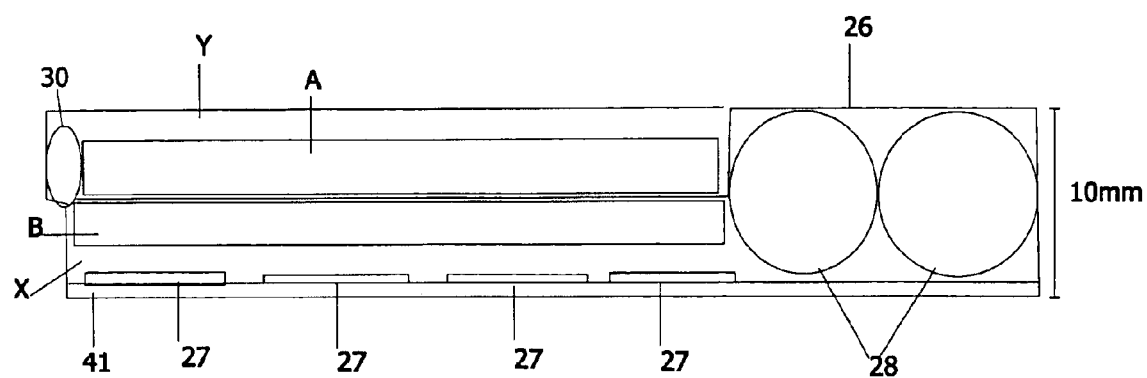
FIG. 9 illustrates a side view of the invention in a folded position

Thus, with reference to FIG. 9, the device 26 maintains a height of 10 mm in a folded position, equivalent to the height of the devices in the prior art. However, the device utilizes efficiently the internal area of the housing and therefore there is adequate space to widen the displayable area of the display screen to 640 pixels×240 pixels.

Figure 10:
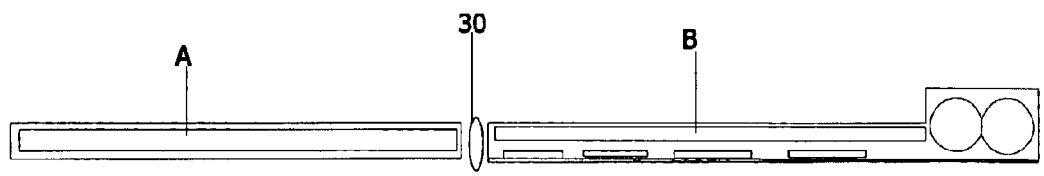
FIG. 10 illustrates the display screen in an open position

FIG. 10 depicts a side view of the hinge 30 joining the display screens and thereby considerably expanding the width of the displayable area.

In another embodiment of the present invention, the virtual browser window located in the host computer is formatted for dimensions of 320 pixels×240 pixels.

The displayable area of the device is divided into two portions and joined by a hinge, and thus comprises dimensions of 640×240. Thus, an image or a page displayed on the device will be divided into two portions and the user must skip over the hinge as the user looks from side to another. To remedy this situation, the virtual browser window is formatted for 320 pixels×240 pixels which is smaller than the displayable area of the device (640×240). Thus, the virtual browser window displays a portion of the image or page that is extracted from the Internet because the virtual browser is formatted for 320×240. The virtual image displayed in the virtual browser window is formatted such that some readable text is displayed completely within the virtual browser window, but graphics, images, tables etc. are larger than the displayable area. Therefore, the data from the Internet that is translated and compressed and sent to the device, is formatted such that text will be displayed within a displayable area of 320×240 and thus on one side of the display screen of the device. However, graphics, images, tables etc. will be displayed on both display screens, or within the displayable area of 640×240. Thus, when the user is reading text, for example a news article, it will be shown on one portion of the display screen and the hinge will not disturb the user.

In an alternate embodiment of the present invention, the device comprises a keyboard that is attached to the device by a hinge.

Figure 11:
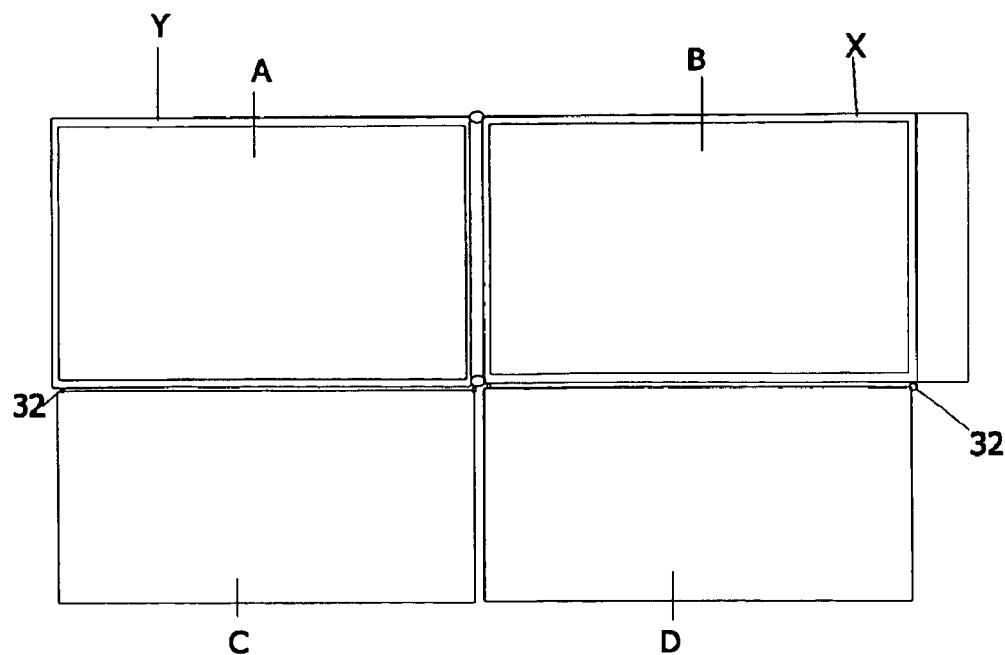
FIG. 11 illustrates the keyboard in an open position

FIG. 11 illustrates the device in an open position. The keyboard is divided into two sections C and D and each section attaches to a portion of the housing X and Y by hinges 32. Thus, the device is rendered more practical because it includes a small keyboard that is faster and easier to use than an electronic keyboard on the display screen.

Figure 12:
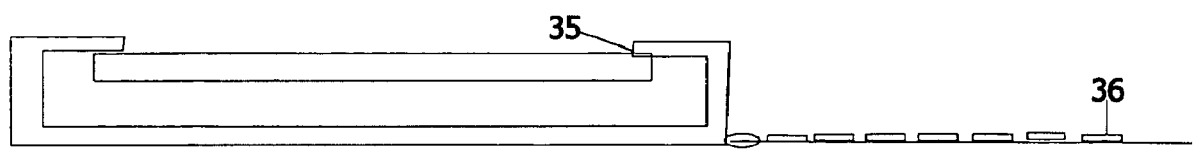
FIG. 12 shows the indentation between the display screen and the housing
Figure 13:
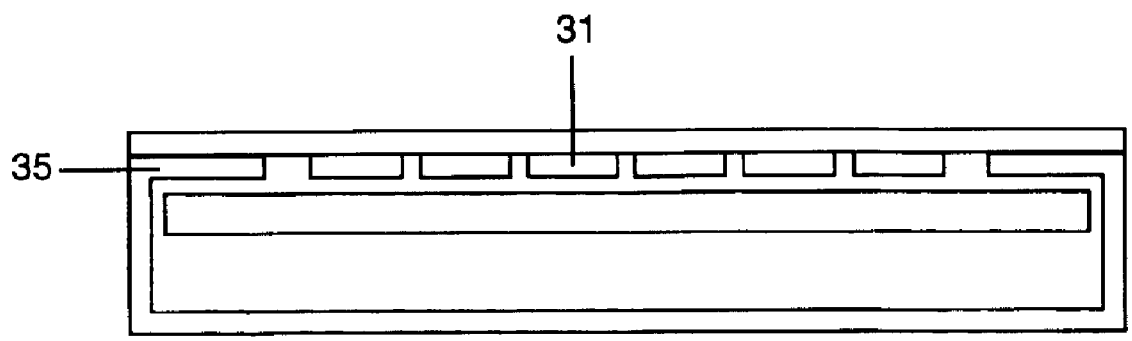
FIG. 13 depicts the keyboard in a folded position

The display screens are normally made such that there is an indentation 35 between the display screen and the housing because the housing have to go over the display screen to hold it in place, as shown in FIG. 12. The keyboard is designed such that the height of the keys 36 is equivalent to the height of the indentation. Thus, in a folded position, as shown in FIG. 13, the keyboard 31 fits into the indentation 35 and maintains the compactness of the device.

The invention has been described in detail with particular reference to the preferred embodiments thereof, but it will be understood that variations and modifications can be effected within the spirit and scope of the invention.

What is claimed:

1. A portable device, comprising:

a housing;

a display screen coupled with the housing, the display screen comprising a plurality of panels, the plurality of panels movable relative to each other, the display screen controllable by electronic components to display images on the plurality of panels, the plurality of panels being substantially aligned in a plane in an open position to form a display surface, the plurality of panels movable to a compact position in which an overall dimension of the plurality of panels is substantially smaller than the display surface; and a keyboard coupled with the plurality of panels of the display screen, the keyboard comprises a plurality of sections, each of the plurality of sections of the keyboard movable relative to one of the plurality of the panels of the display screen;

wherein a height of keys of a first keyboard section of the plurality of sections of the keyboard is substantially equal to a height of an indentation between a first screen panel of the plurality of panels of the display screen and a portion of the housing that holds the first screen panel; and, in the compact position the keys of the first keyboard section fit in the indentation between the first screen panel and the portion of the housing that holds the first screen panel.

2. A portable device, comprising:

a first display section, the first display section having a front side for displaying information;

a second display section hingely coupled with the first display section, the second display section having a front side for displaying information, the second display section rotatable with respect to the first display section to an open position in which the first and second display sections form a display screen, the second display section rotatable with respect to the first display section to a compact position in which the front sides of the first and second display sections face each other;

a first keyboard section rotatably coupled with the first display section;

a second keyboard section rotatably coupled with the second display section;

wherein the first keyboard section is rotatable with respect to the first display section to overlay on top of the first display section; and wherein the second keyboard section is rotatable with respect to the second display section to overlay on top of the second display section.

3. A portable device as in claim 2, wherein when overlaid on top of the first display section, keys of the first keyboard section fit in an indentation of the first display section; and, wherein when overlaid on top of the second display section, keys of the second keyboard section fit in an indentation of the second display section.

4. A portable device as in claim 3, further comprising:

a battery housing coupled with the first display section, the battery housing being substantially thicker than the display screen when the first and second display sections are in the open position.

* * * * *